(12) United States Patent
Hsu

(10) Patent No.: US 8,321,683 B2
(45) Date of Patent: Nov. 27, 2012

(54) ELECTRONIC CONTROL DEVICE AND METHOD FOR OPERATING AN ELECTRIC ROLLER SHUTTER

(75) Inventor: Ming-Yuan Hsu, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 163 days.

(21) Appl. No.: 12/871,918

(22) Filed: Aug. 31, 2010

(65) Prior Publication Data

US 2011/0282496 A1    Nov. 17, 2011

(30) Foreign Application Priority Data

May 13, 2010 (TW) ................................ 99115230 A

(51) Int. Cl.
*H04L 29/00* (2006.01)
(52) U.S. Cl. .............. 713/183; 713/182; 705/72; 726/1; 726/2; 726/3; 726/4; 726/5; 726/6; 726/7; 726/8; 726/9; 726/10; 726/11; 726/12; 726/13; 726/14; 726/15; 726/16; 726/17; 726/18; 726/19; 726/20; 726/21; 726/22; 726/23; 726/24; 726/25; 726/26; 726/27; 726/28; 726/29; 726/30; 726/31; 726/32; 726/33; 726/34; 726/35; 726/36
(58) Field of Classification Search .......... 713/182–186; 726/1–36; 705/72
See application file for complete search history.

(56) References Cited

U.S. PATENT DOCUMENTS

| | | | |
|---|---|---|---|
| 2008/0021952 A1* | 1/2008 | Molinie et al. | 709/203 |
| 2010/0001746 A1* | 1/2010 | Duchene et al. | 324/676 |
| 2011/0154444 A1* | 6/2011 | Sriraghavan et al. | 726/4 |

\* cited by examiner

*Primary Examiner* — Philip Chea
*Assistant Examiner* — Ghazal Shehni
(74) *Attorney, Agent, or Firm* — Altis Law Group, Inc.

(57) ABSTRACT

An electronic control device and method for operating an electric roller shutter include establishing a wireless connection between the electronic control device and an electronic device if a preset login password is input. The electronic control device provides an operation interface to the electronic device, and receives a function instruction from the electronic device if a function key on the operation interface is pressed. The electric roller shutter is operated by the electronic control device according to the received function instruction.

24 Claims, 5 Drawing Sheets

ELECTRONIC CONTROL DEVICE AND METHOD FOR OPERATING AN ELECTRIC ROLLER SHUTTER

BACKGROUND

1. Technical Field

Embodiments of the present disclosure relate to remote control technology, and more particularly to an electronic control device and a method for operating an electric roller shutter using the electronic control device.

2. Description of Related Art

A roller shutter is a type of door or window shutter consisting of many horizontal slats hinged together. An electric roller shutter may be rolled up or rolled down by controlling a motor connected to the electric roller shutter. Electric roller shutters have been used in different buildings, such as shops, carports, and factories. The electric roller shutters may be operated by using one or more wireless remote control devices. However, when many people need to operate the same electric roller shutter, each of these people need to have a wireless remote control device. The cost of buying many wireless remote control devices will be expensive. Furthermore, there is a security risk if many people are given control of the electric roller shutter when there is no operation log to show the operator names and the operation time of the electronic roller shutter.

In addition, although people can operate the electric roller shutter using the wireless remote control devices, the working status of the electric roller shutter cannot be determined during operation of the electric roller shutter.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, Java, C, or Assembly, for example. One or more software instructions in the modules may be embedded in firmware, such as an erasable programmable read only memory (EPROM). It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
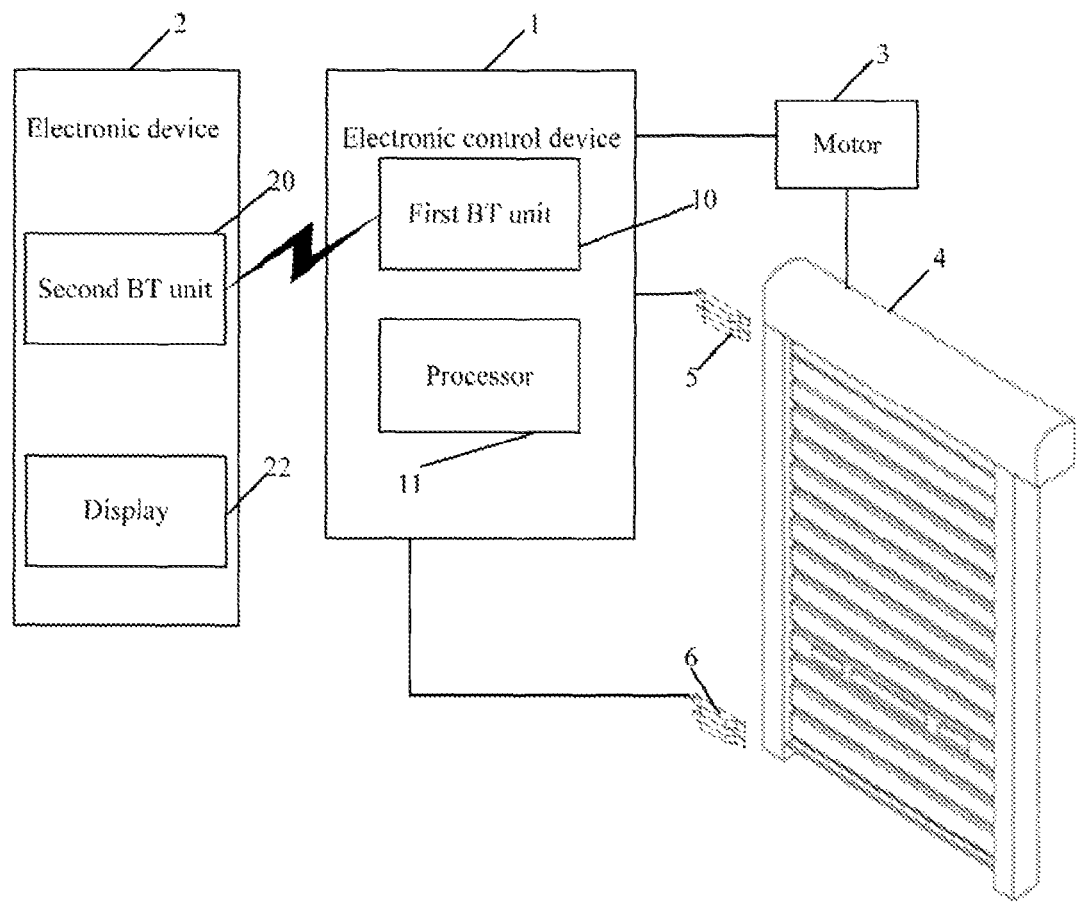
FIG. 1 is a schematic diagram of one embodiment of an electronic control device in communication with a motor to operate an electric roller shutter.

FIG. 1 is a schematic diagram of one embodiment of an electronic control device 1 in communication with a motor 3 to operate an electric roller shutter 4. The electronic control device 1 may operate the electric roller shutter 4 by controlling the motor 3. For example, the electronic control device 1 may control the motor 3 to rotate in a positive direction or a reverse direction. The electric roller shutter 4 rolls up if the motor 3 rotates in the positive direction, or rolls down if the motor 3 rotates in the reverse direction. Detailed descriptions are provided below.

In some embodiments, an electric device 2 may be connected to the electronic control device 1 through a wireless connection. The electronic control device 1 provides an operation interface to the electric device 2. A user of the electronic device 2 may operate the electronic control device 1 through the operation interface, and then the electric roller shutter 4 may be operated accordingly. The wireless connection may be the Internet, a BLUETOOTH (BT) connection, an infrared connection, or other suitable communication connections.

In some embodiments, the electronic control device 1 includes a first BT unit 10. The electronic device 2 includes a second BT unit 20 and a display 22. The electronic device 2 may be connected to the electronic control device 1 through a BT connection using the second BT unit 20 and the first BT unit 10. The display 22 may output various visible data, such as the operation interface, and response information from the electronic control device 1, for example. In some embodiments, the electronic device 2 may be a mobile phone, a personal digital assistant (PDA), or any other communication device. For simplification, only one electronic device 2 is shown in FIG. 1, however it should be understood that a multitude of people may use their personal electronic devices to connect to the electronic control device 1 without adding additional costs.

The electronic control device 1 further includes a plurality of sensor switches, such as a sensor switch 5 and a sensor switch 6 as shown in FIG. 1. The sensor switches may be positioned on different positions of the electric roller shutter 4. In some embodiments, each sensor switch may be triggered when the electric roller shutter 4 stops at the position of each sensor switch. For example, the sensor switch 5 is positioned on the top of the electric roller shutter 4. If the electric roller shutter 4 rolls and stops at the top, the sensor switch 5 is triggered, and then preset position information corresponding to the sensor switch 5 is sent to the electronic device 2. Thus, the user of the electronic device 2 may get to know the position information of the electric roller shutter 4.

Figure 2:
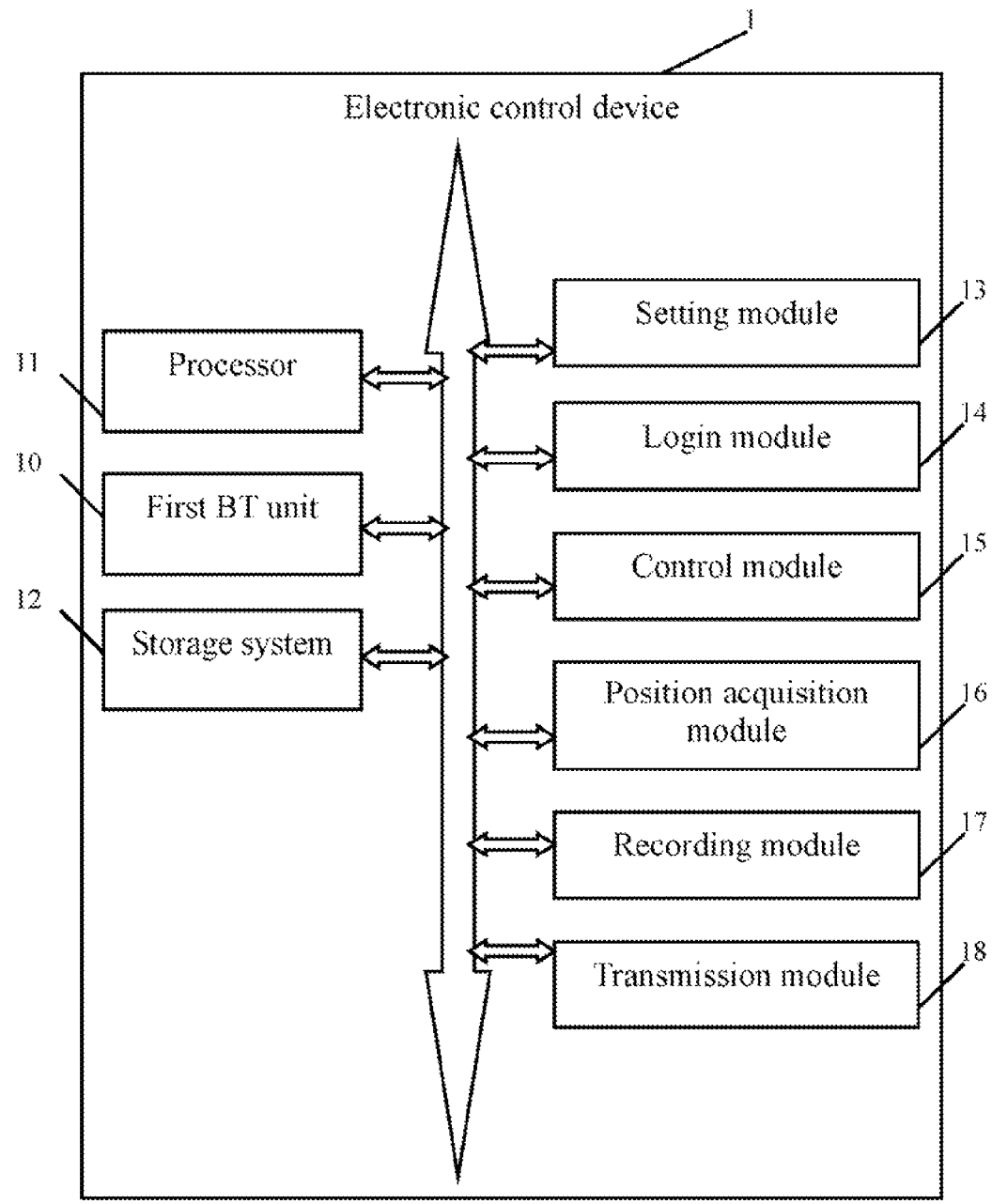
FIG. 2 is a block diagram of one embodiment of the electronic control device.

FIG. 2 is a block diagram of one embodiment of the electronic control device 1. The electronic control device 1 includes a processor 11 and a storage system 12. The processor 11 executes one or more computerized operations of the electronic control device 1 and other applications, to provide functions of the electronic control device 1. The storage system 12 stores one or more programs, such as programs of the operating system, other applications of the electronic control device 1, and various kinds of data, such as preset information. In one embodiment, the storage system 12 may include a memory of the electronic control device 1 and/or an external storage card, such as a memory stick, a smart media card, a compact flash card, or any other type of memory card.

In some embodiments, the electronic control device 1 further includes a setting module 13, a login module 14, a control module 15, a position acquisition module 16, a recording module 17, and a transmission module 18. The modules 13-18 may include computerized codes in the form of one or more programs that are stored in the storage system 12. The computerized codes include instructions that are executed by the at least one processor 11 to provide functions for modules 13-18. Details of these functions will be provided below.

The setting module 13 sets a login password to access an operation interface of the electronic control device 1. The operation interface provides a plurality of function keys. Each of the function keys corresponds to a function instruction for controlling the electric roller shutter 4.

Figure 3:
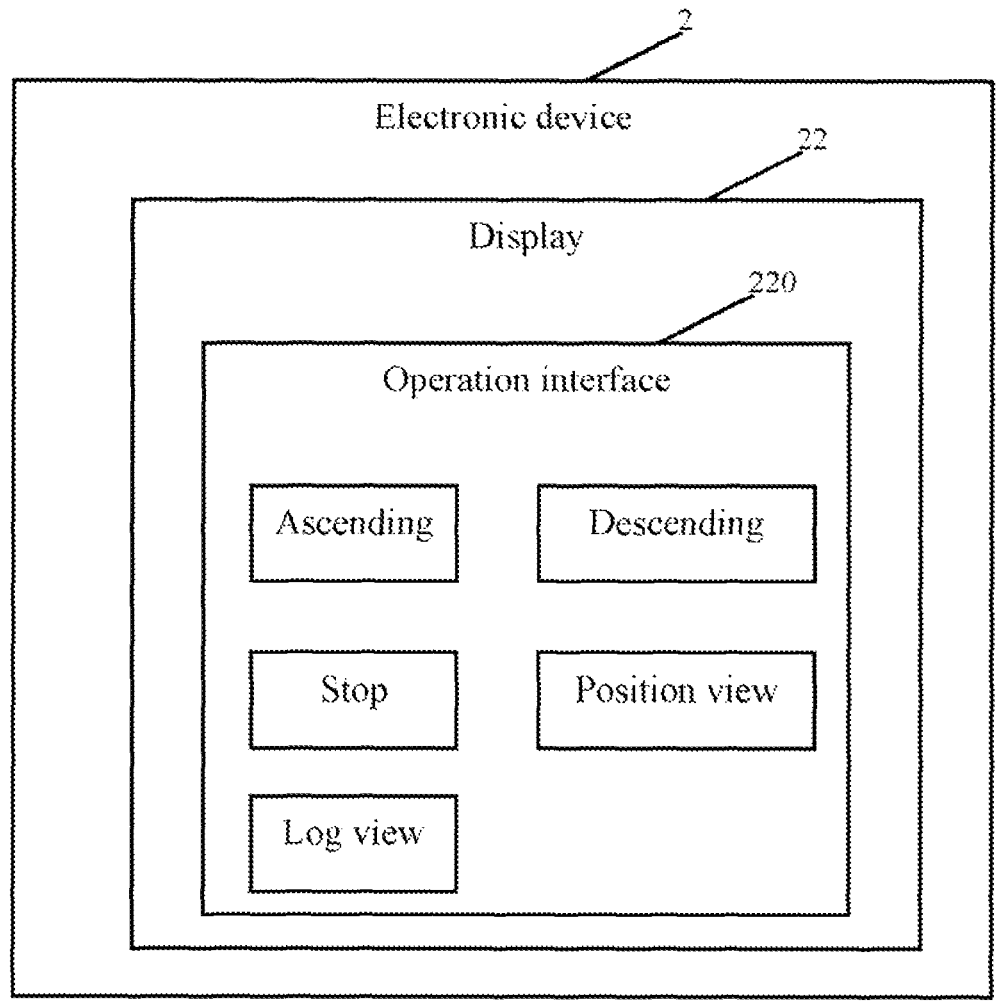
FIG. 3 is a schematic diagram of one embodiment of an operation interface of the electronic control device of FIG. 2.

As shown in FIG. 3, an operation interface 220 provides five function keys, an ascending function key, a descending function key, a stop function key, a log view function key, and a position view function key. In some embodiment, the ascending function key represents a function key to roll up the electric roller shutter 4, and the descending function key represents a function key to roll down the electric roller shutter 4. For example, if the ascending function key is pressed, a function instruction of rolling up the electric roller shutter 4 is sent to the motor 3, to control the motor 3 to rotate in a positive direction. Descriptions of the log view function key and the position view function key are provided below.

The login module 14 receives an input password from the electronic device 2 of the user. If the input password is the same as the login password, the login module 14 establishes a wireless connection between the electronic control device 1 and the electronic device 2. Then the login module 14 provides the operation interface to the electronic device 2 through the wireless connection.

In some embodiments, the electronic device 2 sends a request from the second BT unit 20 to the first BT unit 10 of the electric roller shutter 4. Prompt information is displayed on the display 22 of the electronic device 2, to prompt the user to input a password. If the input password is the same as the login password, the login module 14 determines that the second BT unit 20 mates the first BT unit 10, and the electronic device 2 is a recognized electronic device. In some embodiments, the recognized electronic device may access the operation interface without inputting the login password.

Through the operation interface displayed on the display 22, the user may select a function key to operate the electric roller shutter 4. If a selected function key is pressed, a function instruction corresponding to the selected function key is sent to the electronic control device 1.

The control module 15 receives the function instruction from the electronic device 2, and operates the electric roller shutter 4 by controlling the motor 3 according to the received function instruction. For example, if the descending function key is pressed, the control module 15 executes a function instruction of rolling down the electric roller shutter 4 by controlling the motor 3 to rotate in a reverse direction. During the operation procedure, the user may press another function key to change a current operation. For example, the user may press the stop function key to stop the descent of the electric roller shutter 4.

In other embodiments, the setting module 13 may further set position information of each of the sensor switches as shown in FIG. 1.

Figure 4:
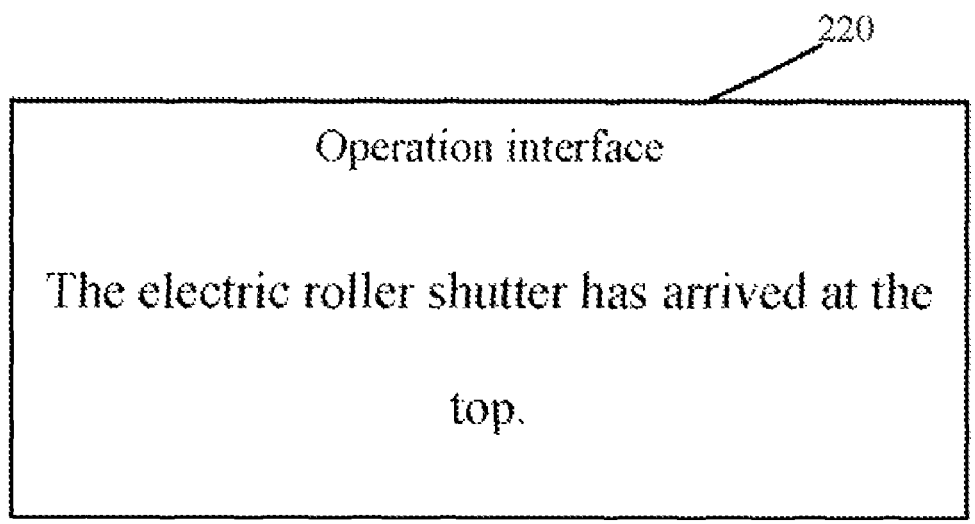
FIG. 4 is a schematic diagram of one embodiment of prompt information displayed on the operation interface of FIG. 3.

If the electric roller shutter 4 stops at a position of a sensor switch, the sensor switch is triggered and a trigger signal is sent to the electronic control device 1. In response to receiving the trigger signal, the position acquisition module 16 sends the position information of the triggered sensor switch to the electronic device 2. As shown in FIG. 4, the position information may be "the electric roller shutter has arrived at the top."

The user of the electronic device 2 also may press the position view function key on the operation interface to view current position information of the electric roller shutter 4.

The recording module 17 generates an operation log to record operation events of the electric roller shutter 4, and stores the operation log in the storage system 12. In some embodiment, the operation log records operator names, operation timestamps, and the operation events. For example, the operation log may record that "July, PM 20:00, 2010-08-08, closed the electric roller shutter."

The transmission module 18 sends the operation log to the electronic device 2. The transmission module 18 may send the operation log periodically or according to user request. For example, the user presses the log view function key, and then the transmission module 18 transmits the operation log to the electronic device 2.

Figure 5:
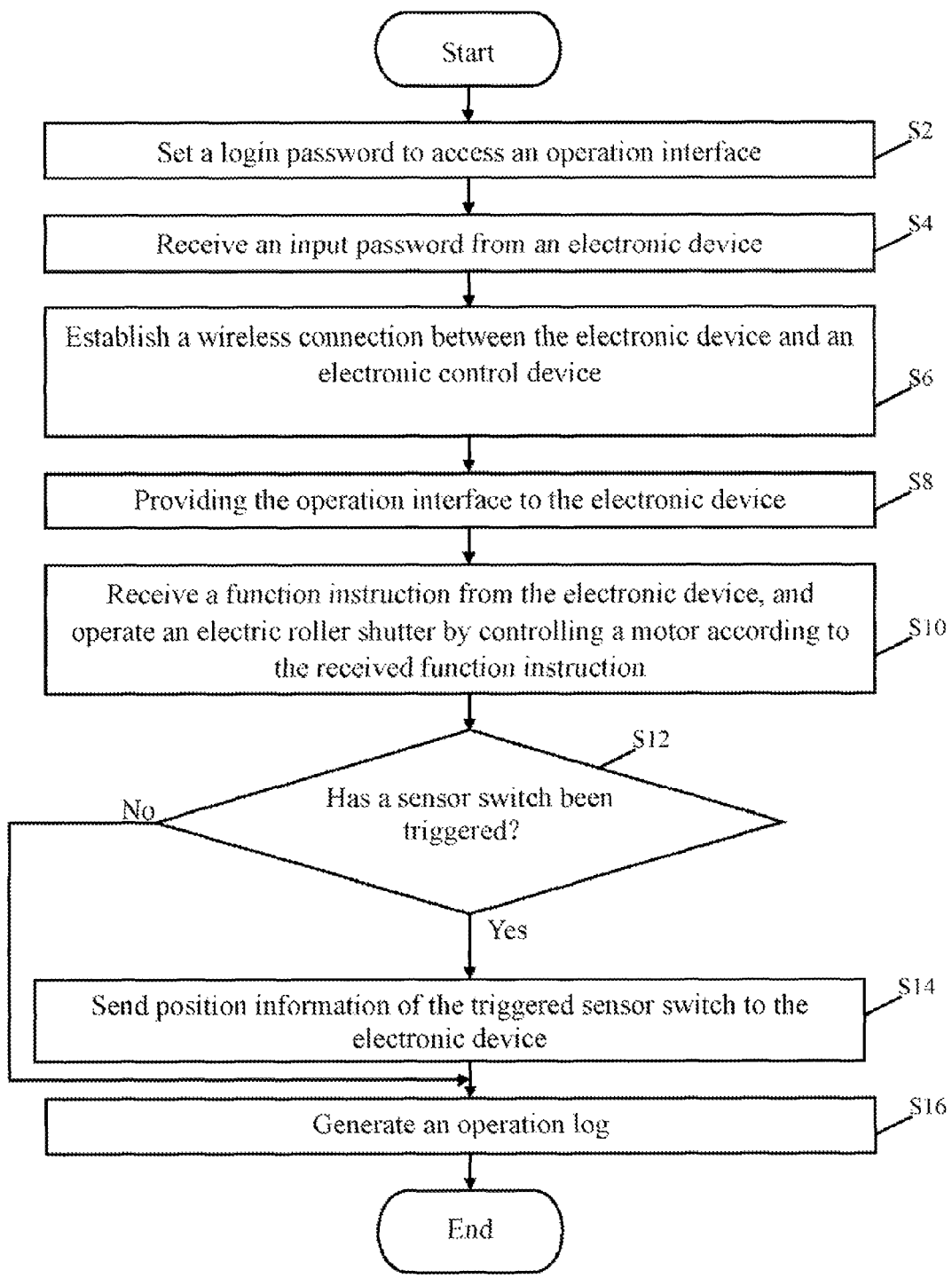
FIG. 5 is a flowchart of one embodiment of a method for operating an electric roller shutter using the electronic control device of FIG. 2.

FIG. 5 is a flowchart of one embodiment of a method for operating the electric roller shutter 4 using the electronic control device 1 of FIG. 2. Depending on the embodiment, additional blocks may be added, others removed, and the ordering of the blocks may be replaced.

In block S2, the setting module 13 sets a login password to access an operation interface of the electronic control device 1. Authorized users may access the operation interface using the login password.

In block S4, the login module 14 receives an input password from the electronic device 2 of the user.

If the input password is the same as the login password, in block S6, the login module 14 establishes a wireless connection between the electronic control device 1 and the electronic device 2.

In block S8, the login module 14 provides the operation interface to the electronic device 2 through the wireless connection. Through the operation interface displayed on the display 22, the user may select a function key to operate the electric roller shutter 4. Under the condition that a selected function key is pressed, a function instruction corresponding to the selected function key is sent to the electronic control device 1.

In block S10, the control module 15 receives the function instruction from the electronic device 2, and operates the electric roller shutter 4 by controlling the motor 3 according to the received function instruction.

In block S12, the position acquisition module 16 determines if a sensor switch has been triggered. If no sensor switch has been triggered, the procedure goes to block S16 directly.

If a sensor switch has been triggered, in block S14, the position acquisition module 16 sends the position information of the triggered sensor switch to the electronic device 2.

In block S16, the recording module 17 generates an operation log to record operation events of the electric roller shutter 4, and stores the operation log in the storage system 12. As mentioned above, the operation log records operator names, operation timestamps, and the operation events.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for operating an electric roller shutter using an electronic control device, the electronic control device in communication with a motor of the electric roller shutter, the method comprising:

setting a login password to access an operation interface of the electronic control device, the operation interface comprising a plurality of function keys, and each of the plurality of function keys corresponding to a function instruction for controlling the electric roller shutter, the plurality of function keys comprising a descending function key;

receiving an input password from an electronic device, and establishing a wireless connection between the electronic control device and the electronic device if the input password is the same as the login password;

providing the operation interface to the electronic device through the wireless connection; and operating the electric roller shutter by controlling the motor in response to receiving a function instruction when one of the plurality of function keys is pressed, comprising:

rolling down the electric roller shutter by controlling the motor to rotate in a reverse direction when the descending function key is pressed.

2. The method according to claim 1, wherein the electronic control device comprises a plurality of sensor switches positioned on different positions of the electric roller shutter, each of the plurality of sensor switches being triggered under the condition that the electric roller shutter stops at a corresponding position.

3. The method according to claim 2, further comprising:
setting position information of each of the plurality of sensor switches; and
in response to receiving a trigger signal from a triggered sensor switch, sending the position information of the triggered sensor switch to the electronic device.

4. The method according to claim 1, further comprising:
generating an operation log to record operation events of the electric roller shutter, the operation log comprising an operator name, operation timestamp, and the operation events; and
sending the operation log to the electronic device.

5. The method according to claim 1, wherein the electronic control device comprises a first BLUETOOTH (BT) unit, and the electronic device comprises a second BT unit, the method further comprising:
determining that the electronic device is a recognized electronic device under the condition that the second BT unit mates the first BT unit, the recognized electronic device capable of accessing the operation interface without inputting the login password.

6. The method according to claim 1, wherein the plurality of function keys comprise an ascending function key, a stop function key, a log view function key, and a position view function key.

7. The method according to claim 6, wherein the step of operating the electric roller shutter by controlling the motor in response to receiving a function instruction when one of the plurality of function keys is pressed further comprises:
rolling up the electric roller shutter by controlling the motor to rotate in a positive direction when the ascending function key is pressed.

8. The method according to claim 6, wherein the step of operating the electric roller shutter by controlling the motor in response to receiving a function instruction when one of the plurality of function keys is pressed further comprises:
sending position information of the electric roller shutter to the electronic device when the position view function key is pressed.

9. An electronic control device, the electronic control device in communication with a motor of an electric roller shutter, the electronic control device comprising:
a storage system;
at least one processor; and
one or more programs stored in the storage system and being executable by the at least one processor, the one or more programs comprising:
a setting module that sets a login password to access an operation interface of the electronic control device, the operation interface comprising a plurality of function keys, and each of the plurality of function keys corresponding to a function instruction for controlling the electric roller shutter, the plurality of function keys comprising a descending function key;
a login module that receives an input password from an electronic device, establishes a wireless connection between the electronic control device and the electronic device if the input password is the same as the login password, and provides the operation interface to the electronic device through the wireless connection; and
a control module that operates the electric roller shutter by controlling the motor in response to receiving a function instruction when one of the plurality of function keys is pressed, comprising rolling down the electric roller shutter by controlling the motor to rotate in a reverse direction when the descending function key is pressed.

10. The electronic control device according to claim 9, wherein the electronic control device comprises a plurality of sensor switches positioned on different positions of the electric roller shutter, each of the plurality of sensor switches being triggered under the condition that the electric roller shutter stops at a corresponding position.

11. The electronic control device according to claim 10, wherein the one or more programs further comprise a position acquisition module:
the setting module that sets position information of each of the plurality of sensor switches; and
the position acquisition module that sends the position information of a triggered sensor switch to the electronic device in response to receiving a trigger signal from the triggered sensor switch.

12. The electronic control device according to claim 9, wherein the one or more programs further comprise:
a recording module that generates an operation log to record operation events of the electric roller shutter, the operation log comprising an operator name, operation timestamp, and the operation events; and
a transmission module that sends the operation log to the electronic device.

13. The electronic control device according to claim 9, wherein the electronic control device comprises a first BLUETOOTH (BT) unit, the electronic device comprises a second BT unit, and the login module further determines that the electronic device is a recognized electronic device under the condition that the second BT unit mates the first BT unit, the recognized electronic device capable of accessing the operation interface without inputting the login password.

14. The electronic control device according to claim 9, wherein the plurality of function keys comprise an ascending function key, a stop function key, a log view function key, and a position view function key.

15. The electronic control device according to claim 14, wherein the control module further rolls up the electric roller shutter by controlling the motor to rotate in a positive direction when the ascending function key is pressed.

16. The electronic control device according to claim 14, wherein the control module further sends position information of the electric roller shutter to the electronic device when the position view function key is pressed.

17. A non-transitory storage medium storing a set of instructions, the set of instructions capable of being executed by a processor to perform a method for operating an electric roller shutter using an electronic control device, the electronic control device in communication with a motor of the electric roller shutter, the method comprising:

setting a login password to access an operation interface of the electronic control device, the operation interface comprising a plurality of function keys, and each of the plurality of function keys corresponding to a function instruction for controlling the electric roller shutter, the plurality of function keys comprising a descending function key;

receiving an input password from an electronic device, and establishing a wireless connection between the electronic control device and the electronic device if the input password is the same as the login password;

providing the operation interface to the electronic device through the wireless connection; and operating the electric roller shutter by controlling the motor in response to receiving a function instruction when one of the plurality of function keys is pressed, comprising:

rolling down the electric roller shutter by controlling the motor to rotate in a reverse direction when the descending function key is pressed.

18. The non-transitory storage medium as claimed in claim 17, wherein the electronic control device comprises a plurality of sensor switches positioned on different positions of the electric roller shutter, each of the plurality of sensor switches being triggered under the condition that the electric roller shutter stops at a corresponding position.

19. The non-transitory storage medium as claimed in claim 18, wherein the method further comprises:

setting position information of each of the plurality of sensor switches; and in response to receiving a trigger signal from a triggered sensor switch, sending the position information of the triggered sensor switch to the electronic device.

20. The non-transitory storage medium as claimed in claim 17, wherein the method further comprises:

generating an operation log to record operation events of the electric roller shutter, the operation log comprising an operator name, operation timestamp, and the operation events; and sending the operation log to the electronic device.

21. The non-transitory storage medium as claimed in claim 17, wherein the electronic control device comprises a first BLUETOOTH (BT) unit, and the electronic device comprises a second BT unit, the method further comprising:

determining that the electronic device is a recognized electronic device under the condition that the second BT unit mates the first BT unit, the recognized electronic device capable of accessing the operation interface without inputting the login password.

22. The non-transitory storage medium as claimed in claim 17, wherein the plurality of function keys comprise an ascending function key, a stop function key, a log view function key, and a position view function key.

23. The non-transitory storage medium as claimed in claim 22, wherein the step of operating the electric roller shutter by controlling the motor in response to receiving a function instruction when one of the plurality of function keys is pressed further comprises:

rolling up the electric roller shutter by controlling the motor to rotate in a positive direction when the ascending function key is pressed.

24. The non-transitory storage medium as claimed in claim 22, wherein the step of operating the electric roller shutter by controlling the motor in response to receiving a function instruction when one of the plurality of function keys is pressed further comprises:

sending position information of the electric roller shutter to the electronic device when the position view function key is pressed.

* * * * *